(12) United States Patent
Lemanowicz et al.

(10) Patent No.: US 11,775,154 B2
(45) Date of Patent: *Oct. 3, 2023

(54) SYSTEMS AND METHODS FOR DETERMINING AND DISPLAYING OPTIMAL ASSOCIATIONS OF DATA ITEMS

(71) Applicant: Palantir Technologies Inc., Palo Alto, CA (US)

(72) Inventors: Lucas Lemanowicz, New York, NY (US); Yehonatan Steinmetz, Brooklyn, NY (US); Ashwin Sreenivas, New York, NY (US); Daniel Spangenberger, New York, NY (US); Tinlok Pang, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/822,724

(22) Filed: Aug. 26, 2022

(65) Prior Publication Data
US 2023/0058155 A1 Feb. 23, 2023

Related U.S. Application Data

(63) Continuation of application No. 17/304,362, filed on Jun. 18, 2021, now Pat. No. 11,429,262, which is a continuation of application No. 16/428,461, filed on May 31, 2019, now Pat. No. 11,061,542.

(60) Provisional application No. 62/679,614, filed on Jun. 1, 2018.

(51) Int. Cl.
G06F 3/04842 (2022.01)
G06F 16/435 (2019.01)
G06F 9/451 (2018.01)

(52) U.S. Cl.
CPC ......... *G06F 3/04842* (2013.01); *G06F 9/451* (2018.02); *G06F 16/435* (2019.01)

(58) Field of Classification Search
CPC ..... G06F 3/04842; G06F 9/451; G06F 16/435
See application file for complete search history.

(56) References Cited

U.S. PATENT DOCUMENTS 10,003,837 B2 * 6/2018 Joglekar .......... H04N 21/25883
10,085,074 B2 * 9/2018 Hood ................. G06Q 30/0251
10,122,808 B2 * 11/2018 Vickrey ............ G06F 16/24578
(Continued)

*Primary Examiner* — Anil K Bhargava
(74) *Attorney, Agent, or Firm* — Knobbe, Martens, Olson & Bear, LLP

(57) ABSTRACT

Systems and methods are described for determining and displaying optimal associations of data items. Data items may include media content such as television programs, and may be associated with advertisements to be displayed during content consumption. A tool may process data regarding segments of viewers that have common characteristics, and further process data regarding viewers of particular data items, to identify degrees of association between individual segments of viewers and particular data items. The degrees of association between a particular data item and multiple segments of viewers, or between multiple data items and a particular segment of viewers, may be displayed in a user interface that identifies optimal associations between data items and advertisements based on the viewer segments having high degrees of association with the data item.

20 Claims, 6 Drawing Sheets

(56) References Cited

U.S. PATENT DOCUMENTS

| | | | | |
|---|---|---|---|---|
| 10,152,757 B2* | 12/2018 | Benfield | | G06F 16/783 |
| 10,182,258 B1* | 1/2019 | Schlack | | H04N 21/25891 |
| 10,282,736 B2* | 5/2019 | Tsai | | G06F 16/248 |
| 11,061,542 B1 | 7/2021 | Lemanowicz et al. | | |
| 11,429,262 B2 | 8/2022 | Lemanowicz et al. | | |
| 2002/0129368 A1* | 9/2002 | Schlack | | H04N 21/44016 |
| | | | | 348/E7.071 |
| 2002/0194058 A1* | 12/2002 | Eldering | | G06Q 30/0242 |
| | | | | 705/14.69 |
| 2003/0018652 A1* | 1/2003 | Heckerman | | G06F 16/358 |
| 2003/0018659 A1* | 1/2003 | Fuks | | G06Q 30/02 |
| | | | | 707/999.005 |
| 2004/0177370 A1* | 9/2004 | Dudkiewicz | | H04N 21/4755 |
| | | | | 725/35 |
| 2005/0120391 A1* | 6/2005 | Haynie | | H04H 60/48 |
| | | | | 725/138 |
| 2011/0166932 A1* | 7/2011 | Smith | | H04N 21/812 |
| | | | | 715/835 |
| 2013/0254025 A1* | 9/2013 | Liu | | G06Q 30/0255 |
| | | | | 705/26.7 |
| 2014/0053203 A1* | 2/2014 | Csiki | | H04N 21/4788 |
| | | | | 725/46 |
| 2014/0053204 A1* | 2/2014 | Milano | | H04N 21/433 |
| | | | | 725/46 |
| 2014/0215506 A1* | 7/2014 | Kalmes | | H04N 21/4524 |
| | | | | 725/14 |
| 2014/0351000 A1* | 11/2014 | Tsai | | G06F 16/248 |
| | | | | 705/7.29 |
| 2015/0288782 A1* | 10/2015 | Deng | | G06F 16/5838 |
| | | | | 709/204 |
| 2016/0117718 A1* | 4/2016 | Hood | | H04N 21/2547 |
| | | | | 725/14 |
| 2016/0366089 A1* | 12/2016 | Bank | | H04L 51/52 |
| 2018/0063596 A1* | 3/2018 | Joglekar | | G06Q 30/0251 |
| 2018/0350144 A1* | 12/2018 | Rathod | | G06Q 20/3224 |
| 2019/0188753 A1* | 6/2019 | McConnell | | G06Q 30/0277 |

* cited by examiner

SYSTEMS AND METHODS FOR DETERMINING AND DISPLAYING OPTIMAL ASSOCIATIONS OF DATA ITEMS

CROSS-REFERENCE TO RELATED APPLICATIONS

This application is a continuation of U.S. patent application Ser. No. 17/304,362, filed on Jun. 18, 2021, now U.S. Pat. No. 11,429,262, which is a continuation of U.S. patent application Ser. No. 16/428,461, filed on May 31, 2019, now U.S. Pat. No. 11,061,542, which claims the benefit of U.S. Provisional Application No. 62/679,614, filed on Jun. 1, 2018, all of which are hereby incorporated by reference in their entirety.

TECHNICAL FIELD

The present disclosure relates to systems and techniques for accessing one or more databases and aggregating, analyzing, and displaying data in interactive user interfaces. More specifically, the present disclosure relates to systems and techniques for determining optimal associations of data items.

BACKGROUND

Entities, such as content providers, often associate data items of a first type (e.g., advertisements) with available slots in data items of a second type (e.g., a television program). It can be difficult, however, for an entity to determine optimal associations. For example, an entity may obtain data regarding consumption of provided content, such as ratings or other information. The data may further be categorized into segments, such as viewership by men aged 18-25, individuals with a gross annual income between $50,000 and $75,000, and the like. However, the segments in the obtained data may not correspond to segments of interest. For example, a particular advertiser may seek to present an advertisement to individuals who are planning to take a vacation in the near future, individuals who have recently had a child, or other market segments that are not captured in the ratings data.

An entity may also have access to other data sources that provide information regarding the characteristics of individuals or groups. However, there may be thousands of market segments that could potentially be identified from such data sources, and there may be thousands of potential pairings of advertisements and television programs. The level of analysis and data visualization required to identify optimal associations is thus beyond the capabilities of unaided humans and prior art systems.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for allowing entities to determine and visualize optimal associations of media content (e.g., advertisements) with particular media programming (e.g., television programs, streaming media, online content, etc.). For example, a tool may be provided that identifies specific market segments of consumers (where a "segment" generally represents consumers having a common particular demographic, behavioral, medical, and/or psychographic attribute, as discussed in more detail below) that are represented in the viewership of a particular television program. A segment may also be related to other attributes, such as to shopping behavior via loyalty programs or pharmacy sources. For example, in some embodiments, consumer segments could include groups of consumers that "purchased [brand name] almond milk," "were diagnosed with athlete's foot," or "were prescribed [medication name]".

The tool may determine, for example, that individuals who enjoy outdoor activities (e.g., individuals in an "outdoor activities" segment) and who plan to buy a car in the next six months are watching a particular television program. A segment may be associated with particular media programming, for example, if viewers in that segment watch more minutes of the particular media programming than viewers in other segments. Advertisements relating to particular outdoor activities (e.g., automotive brands or products, such as vehicles that have features such as a roof rack or a large cargo capacity) may thus be optimally associated with available slots on the television program. In some embodiments, the tool may correlate information regarding viewership of television programs (e.g., ratings) with information regarding viewers (e.g., information collected through surveys or other sources) to identify segments of viewership at a high level of detail. The tool may thus provide detailed information regarding viewership that enables optimal associations.

The tool may provide user interfaces that present information regarding associations between content data items and viewer segments. It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, graph data, image data, and/or other data, and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, images, graphs, and other types of data), translation and delivery of those inputs to various system components, automatic and dynamic execution of complex processes in response to the input delivery, automatic interaction among various components and processes of the system, and automatic and dynamic updating of the user interfaces (to, for example, display the relevant data from various different applications and/or data sources). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data aggregation and analysis technology is limited in various ways (e.g., limited in the types of applications or data sources the data may be drawn from, loss of data interactivity, etc.), and various embodiments of the disclosure provide significant improvements over such technology. Additionally, various embodiments of the present disclosure are inextricably tied to computer technology. In particular, various embodiments rely on detection of user inputs via graphical user interfaces, aggregation of data from different applications and data sources, and automatic processing, formatting, and display of the aggregated data via interactive graphical user interfaces. Such features and others (e.g., automatically determining an application or data source an inputted link is directed to, accessing the application or data source to retrieve and display the requested data, implementing interactivity of displayed data reflective of how the data would be displayed in its native application) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Overview

Figure 1:
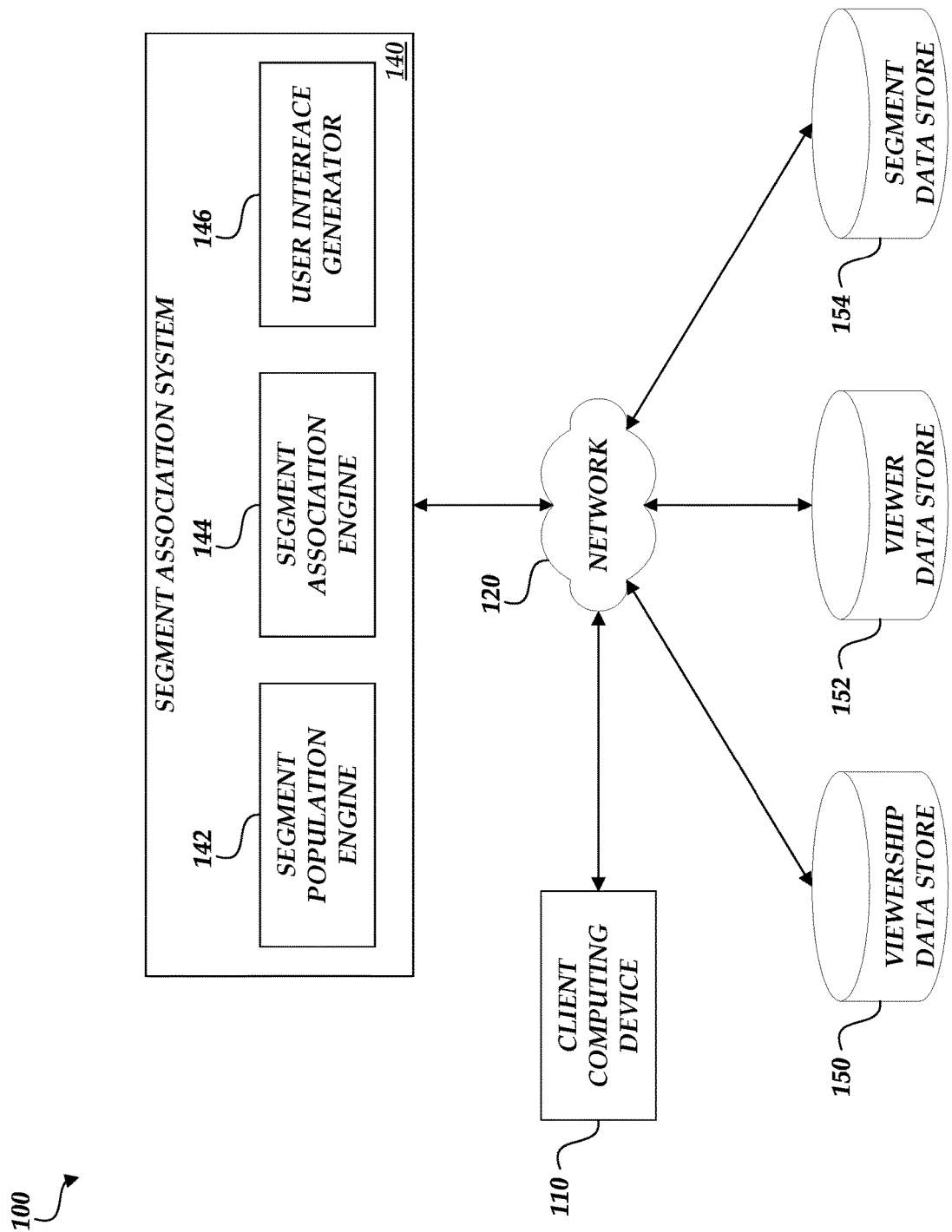
FIG. 1 is a functional block diagram depicting an example network environment for implementing a segment association system in accordance with aspects of the present disclosure.

As described above, it can be difficult for an entity to determine optimal associations between data items. For example, assigning a particular commercial to an available slot on a radio broadcast, podcast, or streaming media may be a better use of the slot than assigning a different commercial that is less relevant to the viewing audience. However, the entity may not be able to determine which of several media items (e.g., advertisements) are most relevant to viewers of numerous slots. The entity may have access to data, such as ratings, that provide general information about the viewing audience for a program. These data may allow the entity to eliminate assignments that are obviously suboptimal, such as product placements that target young adults in programs that are not popular with that demographic. However, the broad demographic categories provided by such data are not specific enough to allow determination of optimal associations.

The entity may also have access to data regarding individuals or households, such as surveys, activity logs, purchase histories, or other information. Such data may allow the entity to determine that a particular individual would be receptive to a particular advertisement. However, because the audience for mass media typically numbers in the millions, the entity cannot make optimal decisions by targeting individual viewers. Further, an unaided human cannot accurately sift through the sheer volume of data collected at the individual or household level to identify patterns and make optimal assignments.

Accordingly, systems and methods are described herein for providing tools that determine and display optimal assignments of data items. For example, a segment association system can process data regarding individuals or households to identify segments of viewers. Segments of viewers may have common characteristics. For example, individuals who all gave the same answer to a particular survey question (e.g., "do you have a valid passport?" or "have you purchased a mobile phone in the past twelve months?") may be identified as a segment. Characteristics that define a segment may include, for example, recent activities, planned activities, food or drink preferences, professions, employment statuses, medical conditions, hobbies, political affiliations, or other such characteristics. In some embodiments, segments may be identified based on the answers to multiple survey questions (e.g., individuals whose answers indicated that they work more than 40 hours per week, frequently travel by air, and have not taken a vacation recently may be identified as a "business traveler" segment). In some embodiments, segments may be determined for an individual based on surveys of the individual's household. For example, the answers to a household survey may indicate that the household includes young children. One or more adults residing at the household may thus be identified as members of a "parents of young children" segment. In some embodiments, segments may be identified based on information derived from activities of individuals (e.g., an individual that makes a purchase at a specialty biking store every week may be associated with a bike enthusiast segment). The number of segments that could be identified may number in the tens of thousands, and may involve interdependencies and patterns that would be impossible for an unaided human to discern or properly interpret.

The segment association system may further process data regarding the viewing habits of individuals, including at least some of the individuals who have been classified into segments. The segment association system may thus determine a degree of association between various segments and the data items that are viewed. For example, the segment association system may determine a degree of association between a first segment (e.g., people who have purchased a computer within the past twelve months) and each of a plurality of data items (e.g., the first segment could be scored with reference to a television program with a science fiction theme, as well as numerous other data items). The segment association system may further determine another degree of association between a second segment (e.g., people whose hobbies include cooking) and the same plurality of data items. The segment association system may then generate user interfaces that display the degrees of association between various segments and data items, and thereby enable interactive determination of optimal data item assignments. For example, the segment association system may indicate that the "people who have recently purchased a computer" segment has a higher degree of association with the sci-fi program than with a cooking program, and thus an advertisement targeting recent computer buyers would be optimally assigned to an advertising slot on the sci-fi program. The segment association system may identify and display degrees of association that would be unexpected or counterintuitive to an unaided human, and may identify and display degrees of association for segments that have no obvious affinity to any particular genre or category of data items. The segment association system may thereby enable optimal associations that would not otherwise be achieved.

While the present disclosure may use television programs and advertisements as examples, it will be understood that the present disclosure is not limited to any particular medium or method of delivery. For example, data items may include radio broadcasts, webcasts, podcasts, streaming media, social media, and the like, and may be associated with network-based advertisements (e.g., advertisements viewed or heard in video games, social media, mobile applications, etc.), advertisements preceding or following movies, product placements, announcements or displays at sporting events, physical kiosks and displays, and so forth.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data item: An item of content that may be viewed, heard, or otherwise consumed. Data items may include audio content, video content, and/or other content. Examples of data items include television programs, radio programs, commercials, podcasts, webcasts, and the like.

Data Store: Any non-transient computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Provider: A provider of one or more data items, such as a television network, internet service provider, broadcaster, podcaster, etc. In some contexts, a provider may be referred to as a "network" or "television network." It will be understood that such references are provided for purposes of example, and do not limit the present disclosure to a particular type of provider.

Viewer: A consumer of content, including multiple forms of content. Thus, the term "viewer" should be understood (unless the context requires otherwise) as including consumers of audio or other content formats.

Segment: A portion of a set of viewers that shares one or more characteristics or attributes. A segment may be defined in terms of demographic, geographic, psychographic, and/or other characteristics, such as behaviors or activities (past, present, or future), interests, hobbies, or other identifiable patterns.

Timeslot: A time interval associated with a data item, such as the day of the week and time of day at which a network television program is typically broadcast. Unless the context requires otherwise, "timeslot" may be used interchangeably with "data item" to reference content that airs on a particular day and time.

Example Embodiments

FIG. 1 is a block diagram of an example system 100 for optimal association of data items in accordance with aspects of the present disclosure. As shown, the example system 100 includes a client computing devices 110, a segment association system 140, and data stores 150, 152, and 154, which may communicate with each other via a network 120.

The client computing device 110 can be any computing device that implements aspects of the present disclosure, and may include one or more software applications such as web browsers, mobile applications, messaging services, or other applications. In some embodiments, multiple client computing devices 110 may communicate with the segment association system 140. In any event, a user or users may interact with the example system 100 through any number of client computing devices 110.

Figure 4:
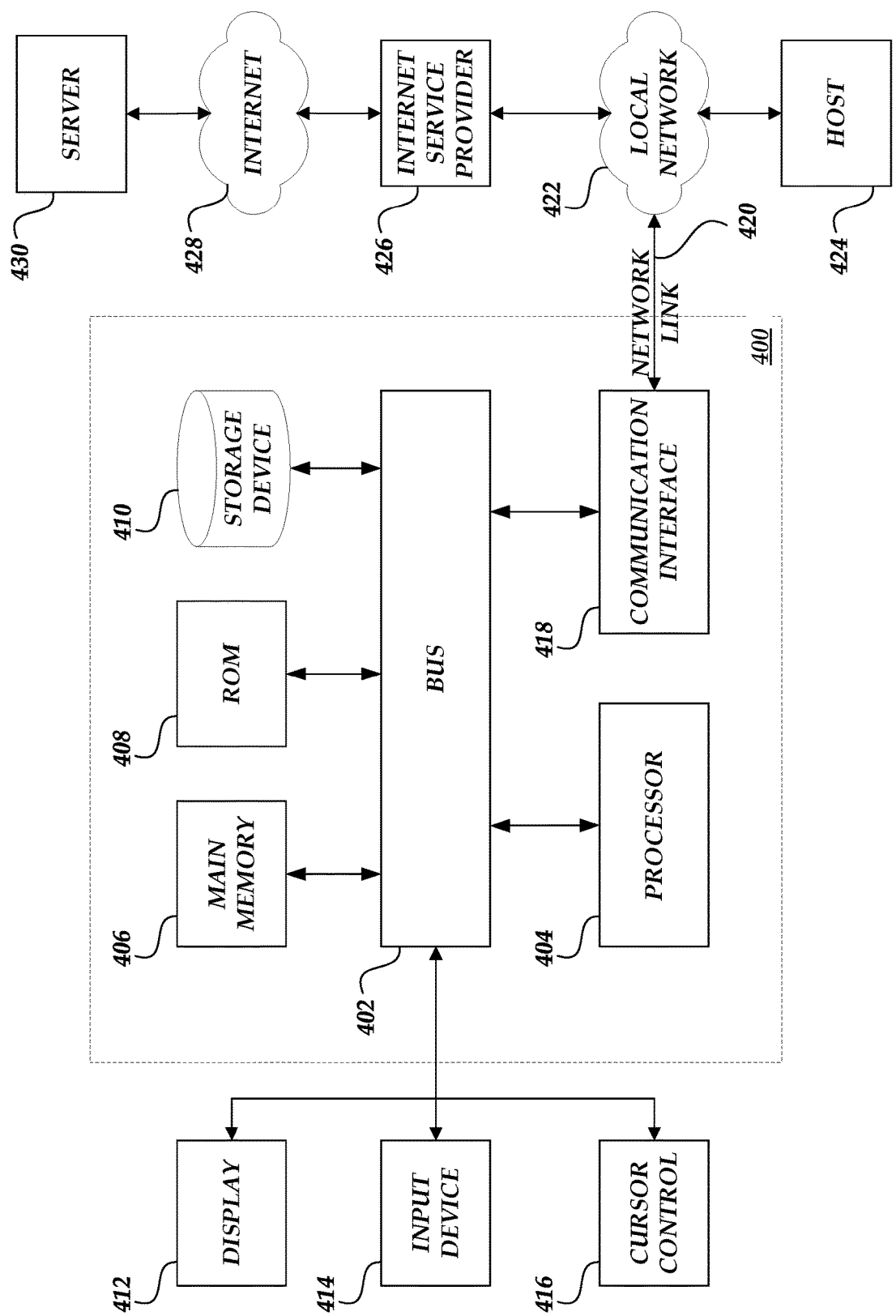
FIG. 4 is a block diagram depicting a general architecture of an example computing device for implementing a segment association system in accordance with aspects of the present disclosure.

The segment association system 140 can be a computing system configured to make associations between data items (e.g., television programs, streaming media, and the like, as discussed above) and segments of viewers that are of interest to advertisers. For example, the segment association system 140 can be a computer system configured to execute software or a set of programmable instructions that process viewer data, segment data, and viewership data to determine associations, and display the resulting associations in one or more user interfaces. In some embodiments, the segment association system 140 can be implemented using a computer system 400, as shown in FIG. 4 and described below.

The segment association system 140 can include one or more computing devices (e.g., server(s)), memory storing data and/or software instructions (e.g., database(s), memory device(s), etc.), and other known computing components. According to some embodiments, the segment association system 140 can include one or more networked computers that execute processing in parallel or use a distributed computing architecture. The segment association system 140 can be configured to communicate with one or more components of the system 100, and can be configured to securely provide information via an interface(s) accessible by users over a network (e.g., the Internet). For example, the segment association system 140 can include a web server that hosts a web page accessible through network 120. In some embodiments, the segment association system 140 can include an application server configured to provide data to one or more client applications executing on computing systems connected to the segment association system 140 via the network 120.

The data stores 150, 152, and 154 may illustratively be any computer-readable data stores that implement aspects of the present disclosure. For example, the data stores 150, 152, and 154 may be magnetic media such as hard disc drives, solid state devices, flash drives, databases, lists, or any other non-transient computer-readable data stores. The viewership data store 150 may store information regarding viewership of particular data items. For example, the viewership data store 150 may store ratings or other data that identify individual viewers and the data items (or portions of data items) that they viewed during a particular time period. The viewer data store 152 may store information regarding individual viewers, such as individual or household survey responses, activity logs, or other data that enables classifying viewers into segments. The segment data store 154 may store information regarding viewer segments, and in some embodiments may store the results of classifying viewers into segments. In some embodiments, one or more of the data stores 150, 152, 154 may be implemented as a single data store, such as a relational database.

The example system 100 further includes a network 120, through which the client computing device 110, segment association system 140, and data stores 150 and 152 may communicate. The network 120 may illustratively be any wired or wireless network, including but not limited to a local area network (LAN), wide area network (WAN), Wi-Fi network, Bluetooth network, cellular network, mesh network, the Internet, or other network or networks. In some embodiments, the system 100 may include multiple networks 120. For example, the client computing device 110 and the segment association system 140 may communicate via the Internet, and the segment association system 140 and the data stores 150, 152, and 154 may communicate via a LAN.

It will be understood that FIG. 1 is provided for purposes of example, and that the system 100 may include more, fewer, or different configurations of devices than the example illustrated in FIG. 1. For example, one or more of the data stores 150, 152, and 154 may be implemented as components of the segment association system 140. As a further example, a server, proxy, or other device may serve as an intermediary between the client computing device 110 and the segment association system 140. The present disclosure is thus understood to include many embodiments beyond the example provided in FIG. 1.

Figure 2A:
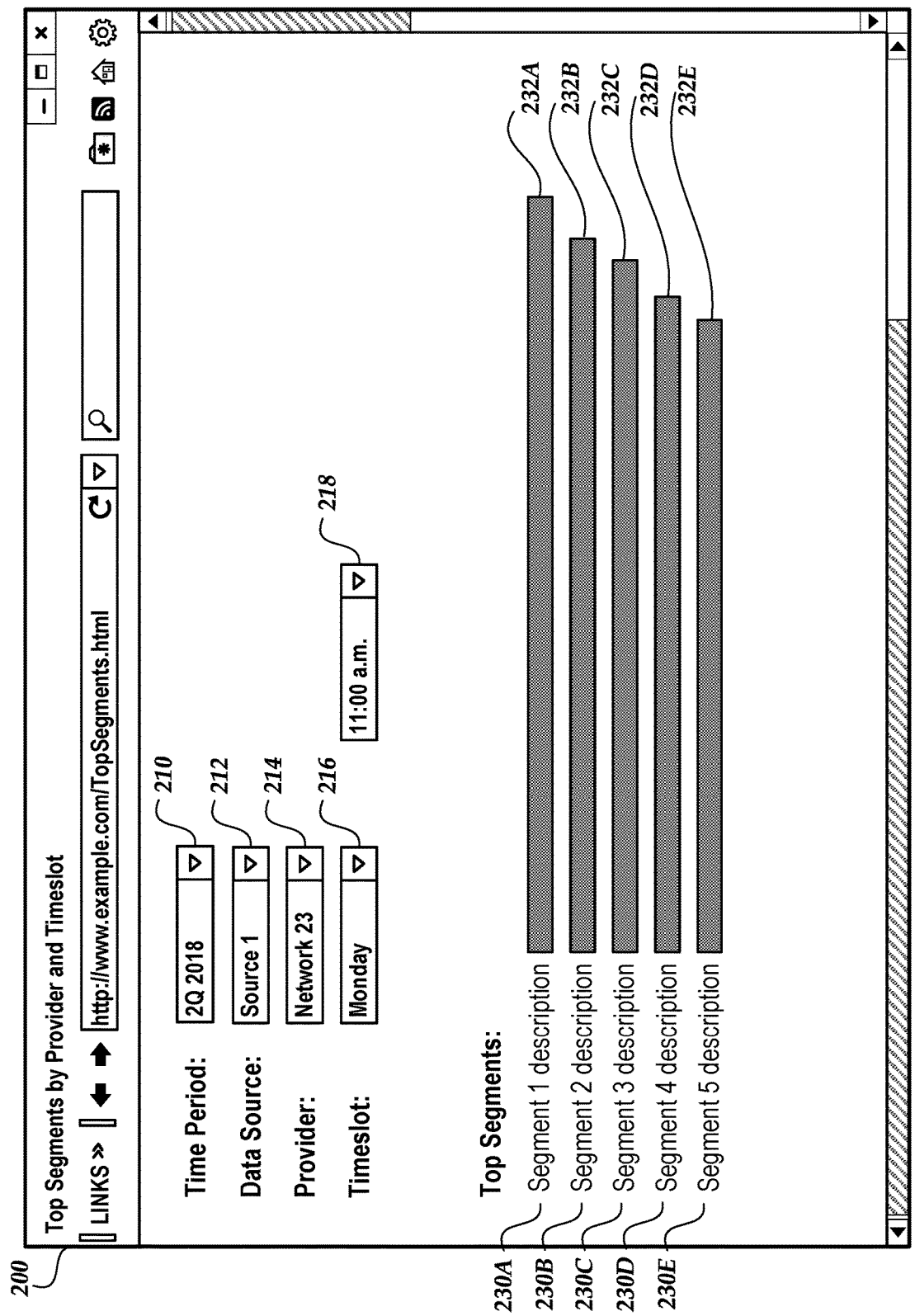
FIGS. 2A-2B are pictorial diagrams depicting example item association user interfaces in accordance with aspects of the present disclosure.

FIG. 2A is a diagram of an example user interface 200 for displaying the viewer segments that are optimally associated with a data item in accordance with aspects of the present disclosure. In the illustrated example, the user interface 200 displays a number of selection controls 210, 212, 214, 216, and 218, which enable selection of a particular set of associations. For example, a time period selector 210 may be displayed, enabling selection of a particular time period. In various embodiments, time periods may include years, quarters, months, weeks, days, days of the week, or other periods, and may include irregular or variable time periods (e.g., "Spring Training," "Regular Season," Playoffs," etc.).

In some embodiments, multiple data sources may be available for ratings or other data. The user interface 200 may thus include a data source selector 212, which enables user selection of one of the data sources. In some embodiments, data sources may be tied to a particular time period. For example, individual or household surveys may be associated with a time period based on the dates upon which these surveys were taken, or viewership data may be associated with the quarter or month in which the viewing took place. In further embodiments, only the data sources that include data from a selected time period may be available for selection in the data source selector 212.

The user interface 200 may further include a content provider selector 214. Content providers may illustratively include any entity that provides data items, such as broadcast television networks, cable networks or channels, terrestrial and/or satellite radio networks, television stations, radio stations, webcasters, podcasters, online content subscription services, movie studios, and the like. In some embodiments, content providers may be organized into hierarchical relationships, such as a sports network, an entertainment network, and a news network that are all owned or operated by the same parent. In other embodiments, content may be organized and selected by content source (e.g., a particular studio or producer).

The user interface 200 may further include a day selector 216 and timeslot selector 218 to enable selection of a particular day and timeslot. In some embodiments, the day selector 216 and timeslot selector 218 may be combined into a single control. In other embodiments, a data item selector may be provided, and day(s) and timeslot(s) may be determined based on the selected data item. For example, a data item or items may be selected that air at irregular times (e.g., a miniseries or a series of sporting events), or a data item may be selected that is associated with multiple days and timeslots. In still further embodiments, a data item may not be associated with any particular day and time, or may only be loosely associated with a particular day and time. For example, a webcast or podcast may be nominally associated with the day and time when it is first made available, but may be viewed or consumed by different individuals at different times. In some embodiments, viewing times for streaming media may be grouped into categories such as "live" (e.g., viewing the streaming media at the time it is first made available), "live+same day," "live+3 days," "live+7 days," and so forth, and a selector may be provided to allow selection of one of these categories.

Although FIG. 2A depicts the selection controls 210, 212, 214, 216, and 218 as drop-down menus, it will be understood that the present disclosure includes any user interface element or combination of elements that enables selection. For example, the user interface 200 may display a grid of timeslots and content providers, and enable selection of content providers and timeslots by selecting cells in the grid. As further examples, the user interface 200 may display checkboxes, radio buttons, lists, buttons, or other controls to enable selection of time periods, data sources, and the like. Additionally, in some embodiments, one or more of the selection controls 210, 212, 214, 216, and 218 may be omitted, combined, or displayed in a separate user interface.

The user interface 200 may further include a number of segments 230A-E that have been identified as having a strong association with the selected data item or timeslot. As described in more detail below with reference to FIG. 3A, a segment association system (such as the segment association system 140 of FIG. 1) may determine degrees of association between data items and segments of viewers. The user interface 200 may in turn display the segments 230A-E having the strongest degrees of association. The segments 230A-E may include human-readable descriptions of the segments, such as "redeemed frequent flyer miles in the past twelve months" or "has a membership at a warehouse club store." The user interface 200 may further display a chart with bars 232A-E, which may indicate the degree of association between each of the segments 230A-E and the selected data item or timeslot. In some embodiments, the bars 232A-E may be labeled with affinity scores, legends, or other information to indicate the degree of association. In further embodiments, the bars 232A-E may be omitted and affinity scores may be presented in a table format or other format.

While FIG. 2A depicts the bars 232A-E as a "top five" list of segments having the highest degrees of association with a particular data item or timeslot, it will be understood that the present disclosure is not limited to displaying a particular number of segments or displaying them in a particular order. For example, in some embodiments, the user interface 200 may include a control that enables selection of a segment or segments of interest, and the user interface 200 may then display the degrees of association for the selected segment or segments regardless of which segments have the highest degrees of association with the data item. In some embodiments, selection of a segment may provide additional information regarding the segment, such as demographics or income distributions of viewers in the segment.

Other variations on FIG. 2A are within the scope of the present disclosure. For example, although FIG. 2A depicts a user interface 200 that is displayed via a web browser, the present disclosure includes embodiments in which an interface is displayed by a dedicated application, such as a mobile or desktop application. As further examples, the user interface 200 may include visualizations other than bar charts, such as pie charts, tables, grids, and the like. As a still further example, the user interface 200 may display a graph with networks and time slots as axes, and display degrees of association between a particular segment and the graphed networks and timeslots as colors, shades, or other indicators. The depicted user interface 200 is thus understood to be illustrative and not limiting.

Figure 2B:
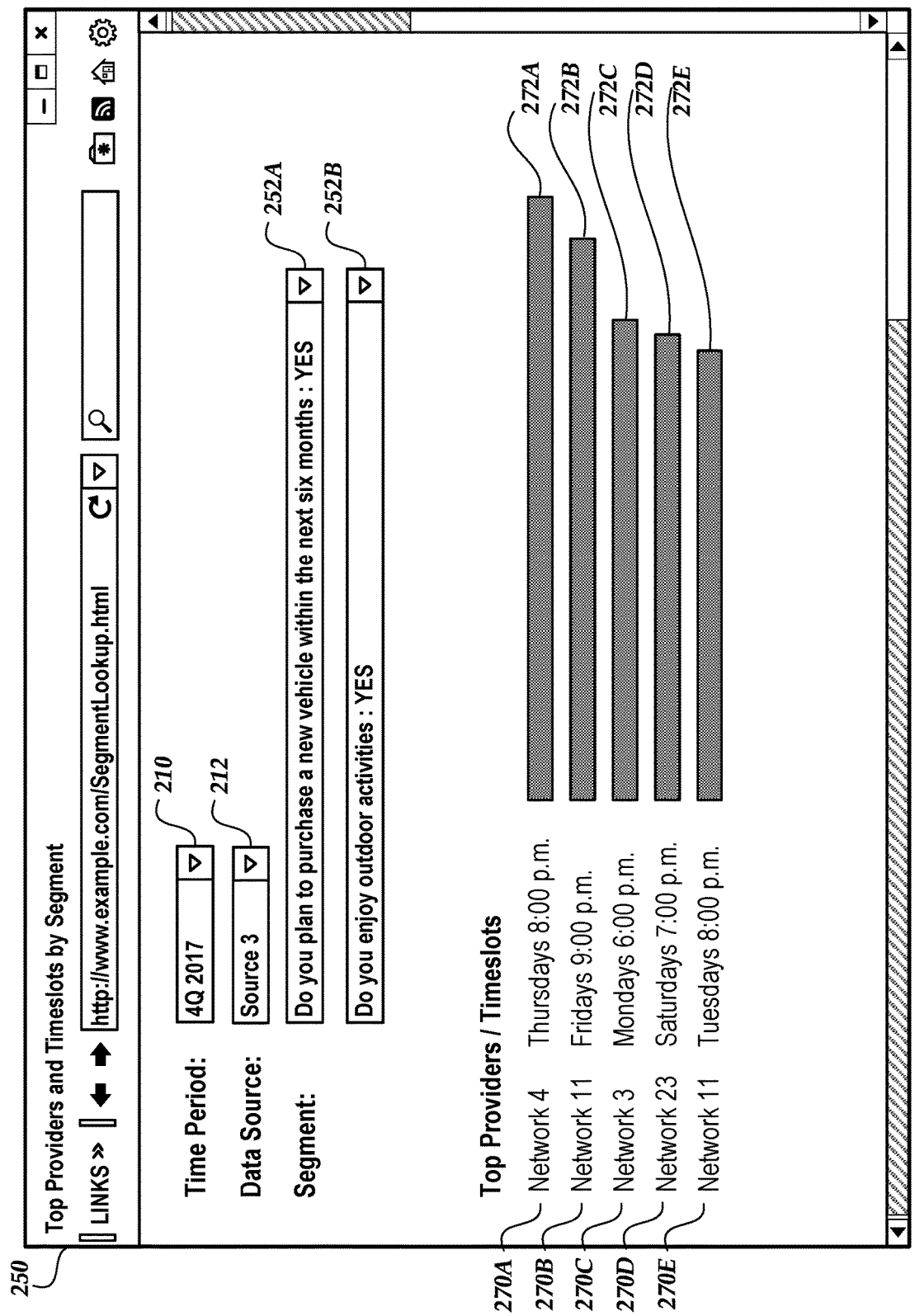

FIG. 2B is a diagram of an example user interface 250 for displaying the data items that are optimally associated with a viewer segment in accordance with aspects of the present disclosure. In the illustrated user interface 250, selection controls 210 and 212 are as previously discussed with reference to FIG. 2A. The user interface 250 further includes segment selection controls 252A-B, which enable selection of a particular segment or segments. In some embodiments, the segment selection controls 252A-B can be used to define a new, custom segment. For example, the segment selection controls 252A-B may enable defining a new segment that is a union or intersection of previously defined segments. The segment selection controls 252A-B may further enable creating a description for the new segment and adding the new segment to a segment data store (such as the segment data store 154 of FIG. 1). In other embodiments, a single segment selection control 252A may be provided and may enable selection of a particular segment.

The user interface 250 further identifies content provider timeslots 270A-E that have a high degree of association with the selected segment. In some embodiments, the user interface 250 may identify the data items that air in the timeslots instead of, or in addition to, identifying the timeslots. As with the user interface 200, the user interface 250 may include bars 272A-E that indicate the degree of association for each of the timeslots 270A-E, and may further include labels, legends, scores or other information regarding the degrees of association. In some embodiments, the user interface 250 may enable selection of data items or timeslots of interest, and may display degrees of association between the data items of interest and a specified segment or segments. In further embodiments, segments and timeslots may be displayed in other formats, such as grids or timelines, to enable analysis of degrees of association across multiple data items, multiple timeslots, multiple providers, and so forth.

Other variations on FIG. 2B are within the scope of the present disclosure. For example, although FIG. 2B depicts a user interface 250 that is displayed via a web browser, the present disclosure includes embodiments in which an interface is displayed by a dedicated application, such as a mobile or desktop application. As further examples, the user interface 250 may include additional information for each segment, such as universe estimates (e.g., the estimated size of this segment within a given population, such as the population of the United States), indices, rating scores, and the like. The depicted user interface 250 is thus understood to be illustrative and not limiting.

Figure 3A:
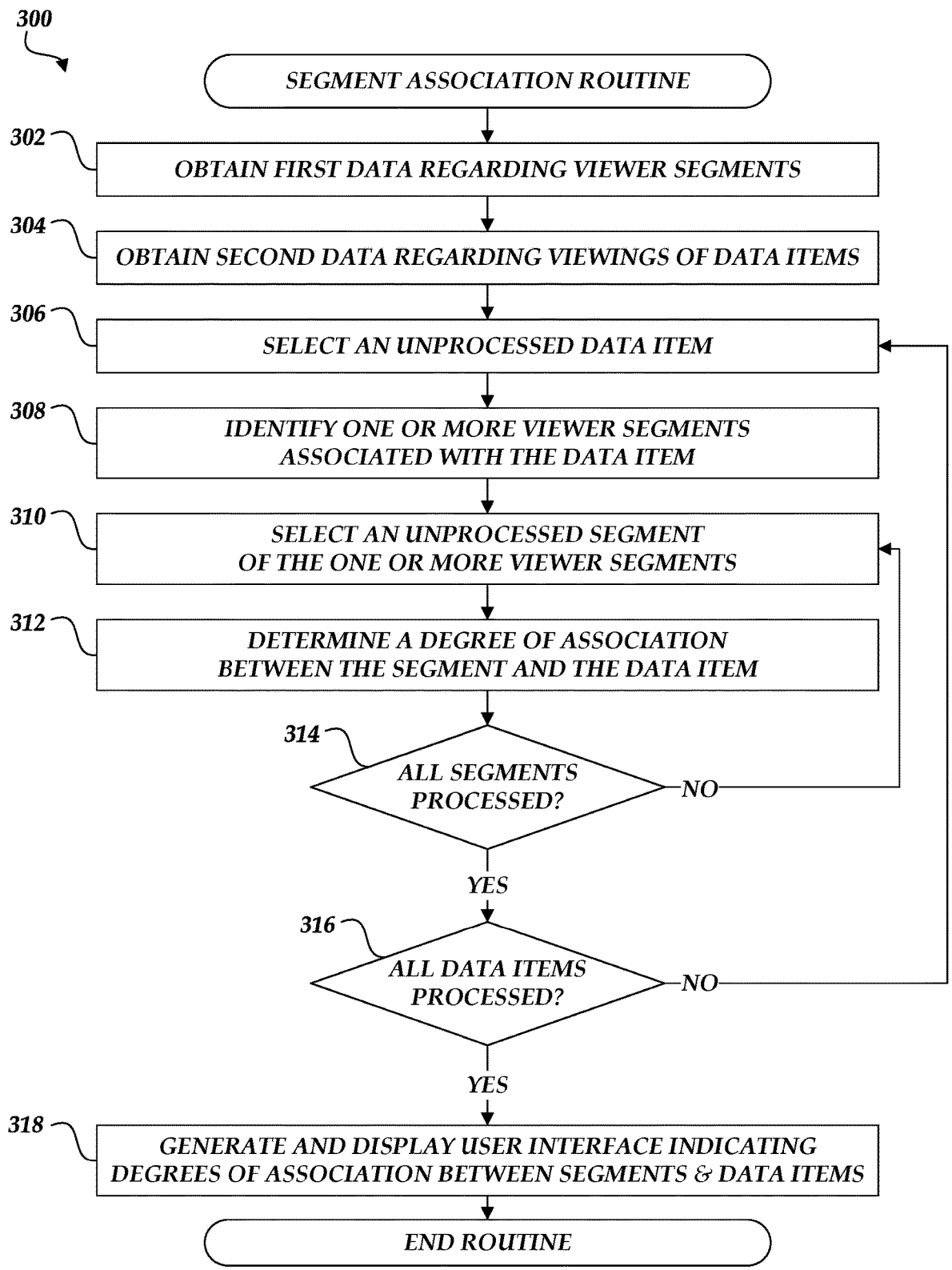
FIG. 3A is a flow diagram depicting an example segment association routine that may be implemented by a segment association system in accordance with aspects of the present disclosure.

FIG. 3A is a flowchart depicting an illustrative routine 300 for determining degrees of association between data items and segments of viewers. The routine 300 may be carried out, for example, by the segment association system 140 depicted in FIG. 1, or various blocks of the routine 300 may be carried out by a component or components of the segment association system 140, such as the segment population engine 142 and the segment association engine 144. Depending on the embodiment, the routine 300 may include more and/or fewer blocks and the blocks may be carried out in an order different than illustrated.

At block 302, first data regarding viewer segments may be obtained. In some embodiments, as described above, all or part of the first data may be generated or aggregated based on data regarding individual viewers or households. For example, a segment may be defined by a criterion, such as "answered 'rent' to the survey question 'do you own or rent your current home?'", and the segment may be populated by identifying individuals who satisfy the criterion. As a further example, a segment may be generated that represents the union or intersection of other, previously defined segments. In some embodiments, a user interface may be provided for creating custom segments, and information received via the user interface may be used to generate custom segments from individual or household viewer data.

At block 304, second data may be obtained regarding viewings of data items. In some embodiments, the second data may be associated with a time period in which the data items were available for viewing, such as a calendar quarter (e.g., the first quarter of 2018). In further embodiments, the first data may be associated with the same time period or a corresponding time period. The second data may include information that enables mapping of individual viewers in the second data to the individuals who were surveyed to collect the first data. For example, a unique ID number may be assigned to an individual, and may be used to associate the individual's viewing habits with their survey responses. In some embodiments, the first data and the second data may be obtained from the same source, such as a third-party service that monitors individual viewers to generate ratings data. In several embodiments, the first data and the second data may be anonymized such that individuals cannot be personally identified.

At block 306, an unprocessed data item (that is, a data item that the routine 300 has not previously processed) may be selected. At block 308, in some embodiments, one or more viewer segments associated with the data item may be identified. Illustratively, the first data may contain tens of thousands or even hundreds of thousands of segments, some of which may not be represented in the second data, or which may be represented in insufficient quantity. For example, the number of viewers of a particular program who are in the "have traveled outside the United States in the past twelve months" segment may not be statistically significant. A filtering function or other criterion may thus be used to identify a subset of segments that are well-represented in the second data. In other embodiments, block 308 may be omitted and all available viewer segments may be processed by the routine 300.

At block 310, an unprocessed segment may be selected. At block 312, a degree of association may be determined between the selected segment and the selected data item. In some embodiments, the degree of association may be determined using a term frequency—inverse document frequency ("TF-IDF") function, such as:

$$segmentMinutes_{p,q} \times \log\left(\frac{totalMinutes_q}{totalSegmentMinutes_q}\right)$$

In the above function, the term frequency ("TF") segmentMinutes$_{p,q}$ is the total number of minutes that the selected segment watched the selected data item or timeslot p (which is associated with a particular provider) during a time period q. In some embodiments, q is the time period associated with the second data (e.g., a calendar quarter). The inverse document frequency ("IDF") is a logarithmic function that includes a numerator totalMinutes$_q$, which is the total number of minutes of available content during the time period q (regardless of how many people watched it or how often it was watched), and a denominator totalSegmentMinutes$_q$, which is the total number of minutes that individuals in the segment watched any data item during the time period q. The TF-IDF function thus quantifies the degree of association between the segment and the data item and acts as a weighting function. For example, a segment of "people who have been to the supermarket in the past twelve months" may be large relative to the total population of viewers, and thus the TF of the segment may be relatively high for any given data item. However, the relative size of the segment causes it to have a relatively low IDF, and so the function is only likely to identify a high degree of association between a data item and a large segment if the TF for the data item (that is, the total amount of time this segment spends viewing the data item) is exceptionally high. As a further example, a segment of "people whose hobbies include mountain climbing" may be relatively small compared to the total population, and thus the segment would have a relatively high IDF. However, the segment would have a relatively low TF in light of its relative size. The function thus identifies segments that are large enough to have a significant TF (and thus be large enough to be of interest to advertisers) but also small enough to have a significant IDF (and thus be targetable with specific advertisements). In various embodiments, the degree of association may be determined based on minutes viewed, distinct viewers, or similar criteria.

At decision block 314, a determination may be made as to whether all of the segments identified at block 308 have been processed. If not, then the routine 300 branches to block 310, selects one of the remaining segments, and iterates through blocks 310, 312, and 314 until all of the segments have been processed. The routine 300 then branches to decision block 316, where a determination may be made as to whether all of the data items have been processed. If not, then the routine 300 branches to block 306 and iterates until all of the data items have been processed.

When all of the segments have been processed for all of the data items, the routine 300 branches to block 318, where a user interface may be generated and displayed to indicate the determined degrees of association between segments and data items. The routine 300 may generate, for example, the user interface 200 or the user interface 250 as depicted in FIGS. 2A and 2B. In some embodiments, block 318 may be omitted and the degrees of association may be stored in a data store for later access. For example, the degrees of association may be stored and then subsequently accessed via queries or API calls. In other embodiments, the routine may output a subset of the determined degrees of association for further analysis.

Figure 3B:
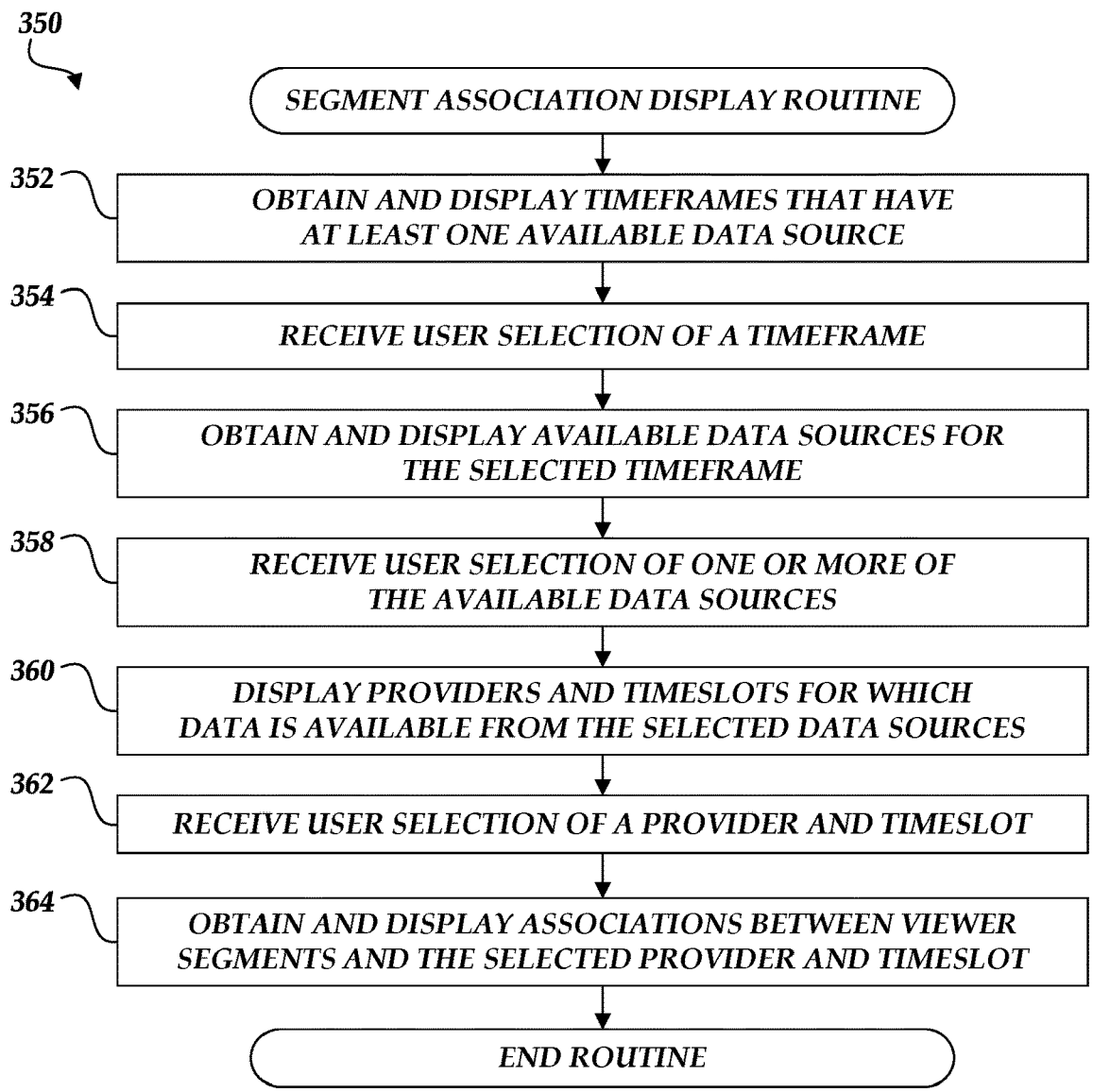
FIG. 3B is a flow diagram depicting an example segment association display routine that may generate item association user interfaces in accordance with aspects of the present disclosure.

FIG. 3B is a flowchart depicting an illustrative routine 350 for determining degrees of association between data items and segments of viewers. The routine 350 may be carried out, for example, by the segment association system 140 depicted in FIG. 1, or various blocks of the routine 350 may be carried out by a component or components of the segment association system 140, such as the user interface generator 146. Depending on the embodiment, the routine 350 may include more and/or fewer blocks and the blocks may be carried out in an order different than illustrated.

At block 352, data sources may be obtained and timeframes that have at least one available data source may be displayed. The timeframes may, for example, be calendar quarters, years, or other time periods as described above. At block 354, a user selection of a timeframe may be received.

At block 356, the available data sources for the selected timeframe may be obtained. A data source may be associated with a particular timeframe, as described above, or in some embodiments may be associated with multiple timeframes or common to all timeframes. In some embodiments, if more than one data source is available for the selected timeframe, the available data sources may be displayed. In these embodiments, at block 358, one or more of the available data sources may be selected.

At block 360, providers and timeslots for which data is available from the selected data source(s) may be displayed. For example, a list of television networks and corresponding programming schedules may be displayed. At block 362, user selection of a particular provider and timeslot may be received. In some embodiments, only a provider may be selected. In other embodiments, only a timeslot may be selected. For example, a user may request degrees of association for viewer segments for all programming on a particular network, or for a particular day and time across all networks.

At block 364, degrees of association between viewer segments and the selected provider(s) and timeslot(s) may be obtained and displayed. In some embodiments, the degrees of association may be displayed interactively, such that the user may select a particular degree of association and receive more information regarding the segment, the provider, the timeslot, or other information. The information displayed at block 364 may thus enable optimal assignments of advertisements to available advertising spots in data items, as described above.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

For example, FIG. 4 is a block diagram that illustrates a computer system 400 upon which various embodiments may be implemented. Computer system 400 includes a bus 402 or other communication mechanism for communicating information, and a hardware processor 404, or multiple processors 404, coupled with bus 402 for processing information. Hardware processor(s) 404 may be, for example, one or more general purpose microprocessors.

Computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, solid state drive, USB thumb drive (flash drive), etc., is provided and coupled to bus 402 for storing information and instructions.

Computer system 400 may be coupled via bus 402 to a display 412, such as a cathode ray tube (CRT) or LCD display (or touchscreen), for displaying information to a computer user. An input device 414, including alphanumeric and other keys, is coupled to bus 402 for communicating information and command selections to processor 404. Another type of user input device is cursor control 416, such as a mouse, trackball, trackpad, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touchscreen without a cursor.

Computing system 400 may include a user interface module to implement a GUI that may be stored in a mass storage device as computer executable program instructions that are executed by the computing device(s). Computer system 400 may further, as described below, implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more computer readable program instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

Various forms of computer readable storage media may be involved in carrying one or more sequences of one or more computer readable program instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 4210 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410 or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
   a data store configured to store computer-executable instructions; and
   a processor in communication with the data store, wherein the computer-executable instructions, when executed by the processor, configure the processor to perform operations including:
      accessing first data identifying a plurality of segments of consumers of media content;
      accessing second data identifying a plurality of consumers of media content, wherein individual consumers in the plurality of consumers of media content consumed a content item from a specified source;
      determining, based at least in part on the plurality of segments of consumers and the plurality of consumers, a degree of association between individual content items and a characteristic associated with each consumer in a first segment of consumers; and
      causing display of a user interface that enables selection of one or more characteristics associated with consumers, wherein the user interface includes the degree of association between the selected one or more characteristics and one or more content items.

2. The system of claim 1, wherein each segment in the plurality of segments of consumers of media content corresponds to a respective characteristic associated with individual consumers in the segment.

3. The system of claim 2, wherein the respective characteristic is associated with each consumer in the segment.

4. The system of claim 1, wherein the individual consumers in the plurality of consumers of media content consumed the content item from the specified source at a first date and time.

5. The system of claim 1, wherein the individual consumers in the plurality of consumers of media content consumed the content item from the specified source at one of a plurality of dates and times.

6. The system of claim 1, wherein the data store is configured to store further computer-executable instructions that, when executed by the processor, configure the processor to perform further operations including generating the user interface.

7. A computer-implemented method comprising:
   obtaining first data identifying a plurality of segments of consumers of media content;
   obtaining second data identifying a plurality of consumers of media content, wherein individual consumers in the plurality of consumers of media content consumed a content item from a specified source;
   determining, based at least in part on the plurality of segments of consumers and the plurality of consumers, a degree of association between individual content items and a characteristic associated with each consumer in a first segment of consumers; and
   causing display of a user interface that enables selection of one or more characteristics associated with consumers, wherein the user interface includes the degree of association between the selected one or more characteristics and one or more content items.

8. The computer-implemented method of claim 7, wherein the user interface enables selection of a plurality of viewing time categories.

9. The computer-implemented method of claim 8, wherein the plurality of viewing time categories includes one or more of a "live" category, "live+same day" category, "live+3 days" category, or "live+7 days" category.

10. The computer-implemented method of claim 7, wherein the user interface includes an estimated size of one or more segments of the plurality of segments of consumers of media content.

11. The computer-implemented method of claim 7, wherein the user interface includes information that enables mapping of individual consumers in the second data to corresponding portions of the first data.

12. The computer-implemented method of claim 7, wherein the degree of association between individual content items and the characteristic associated with each consumer in the first segment of consumers is determined based at least in part on an amount of minutes viewed by individual consumers of the individual content item.

13. The computer-implemented method of claim 7 further comprising determining, based at least in part on the plurality of segments of consumers and the plurality of consumers, a degree of association between individual timeslots and a characteristic associated with each consumer in a first segment of consumers.

14. The computer-implemented method of claim 13, wherein the user interface enables selection of one or more timeslots.

15. The computer-implemented method of claim 7 further comprising determining, based at least in part on the plurality of segments of consumers and the plurality of consumers, a degree of association between the specified source and a characteristic associated with each consumer in a first segment of consumers.

16. The computer-implemented method of claim 15, wherein the user interface enables selection of one or more sources.

17. A non-transitory computer-readable medium storing computer-executable instructions that, when executed by a processor, configure the processor to perform operations including:
   determining, based at least in part on first data identifying a plurality of segments of consumers of content items and second data identifying a plurality of consumers of content items, a degree of association between individual content items and a characteristic associated with each consumer in a first segment of consumers; and causing display of a user interface that enables selection of one or more characteristics associated with consumers, wherein the user interface includes the degree of association between the selected one or more characteristics and one or more content items.

18. The non-transitory computer-readable medium of claim 17, wherein individual consumers in the plurality of consumers of content items consumed a content item from a specified source.

19. The non-transitory computer-readable medium of claim 17, wherein at least one of the first data or the second data is obtained from a plurality of data sources.

20. The non-transitory computer-readable medium of claim 19, wherein the user interface enables selection from the plurality of data sources.

\* \* \* \* \*